United States Patent [19]

Miyake et al.

[11] 4,154,917

[45] May 15, 1979

[54] PRODUCTION OF POROUS POLYMERS

[75] Inventors: Tetsuya Miyake, Tokyo; Kunihiko Takeda, Yokohama; Akihiko Ikeda, Yokohama; Kazuo Inamura, Yokohama, all of Japan

[73] Assignee: Asahi Kasei Kogyo Kabushiki Kaisha, Osaka, Japan

[21] Appl. No.: 882,294

[22] Filed: Feb. 27, 1978

Related U.S. Application Data

[62] Division of Ser. No. 677,120, Apr. 14, 1976, Pat. No. 4,093,570.

[30] Foreign Application Priority Data

| May 1, 1975 [JP] | Japan | 50-52911 |
| May 10, 1975 [JP] | Japan | 50-55238 |
| Jun. 9, 1975 [JP] | Japan | 50-69361 |
| Jun. 9, 1975 [JP] | Japan | 50-69362 |

[51] Int. Cl.² .............................................. C08J 5/10
[52] U.S. Cl. ................................. 528/113; 528/117; 528/128; 528/131
[58] Field of Search ............... 260/2.5 B, 2.5 HB; 528/113, 117, 128, 131

[56] References Cited

U.S. PATENT DOCUMENTS

| Re. 27,026 | 1/1971 | Alfrey et al. | 260/2.5 B |
| 3,468,820 | 9/1969 | Buchholz et al. | 260/2.5 B |
| 3,558,530 | 1/1971 | Schröder et al. | 260/2.5 B |
| 3,816,355 | 6/1974 | Clemens | 260/2.5 B |
| 3,888,945 | 6/1975 | Arndt et al. | 260/2.5 B |

FOREIGN PATENT DOCUMENTS

| 728226 | 2/1966 | Canada | 260/2.5 B |
| 2121448 | 4/1970 | Fed. Rep. of Germany | 260/2.5 B |
| 894391 | 4/1962 | United Kingdom | 260/2.5 B |
| 932125 | 7/1963 | United Kingdom | 260/2.5 B |
| 932126 | 7/1963 | United Kingdom | 260/2.5 B |
| 942388 | 11/1963 | United Kingdom | 260/2.5 B |
| 1269807 | 4/1972 | United Kingdom | 260/2.5 B |
| 1274361 | 5/1972 | United Kingdom | 260/2.5 B |
| 1370477 | 10/1974 | United Kingdom | 260/2.5 B |

*Primary Examiner*—Maurice J. Welsh
*Attorney, Agent, or Firm*—Sprung, Felfe, Horn, Lynch & Kramer

[57] ABSTRACT

A method of producing a polar, porous polymer comprising polymerizing a monomer mixture comprising:

(A) about 2 to about 98 percent by weight of at least one cross-linkable monomer having a plurality of $CH_2=C<$ groups and (B) about 98 to about 2 percent by weight of at least one monomer selected from the group consisting of (i) copolymerizable monoethylenically unsaturated monomers and (ii) conjugated diene monomers, about 15 to about 100 percent by weight of the total monomers (A) and (B) being polar monomers, in the presence of an organic medium which does not react with any of monomers (A) and (B), and selected from the group consisting of:

(I) a mixed organic liquid consisting essentially of (i) at least one liquid which dissolves at least one homopolymer of monomers (A) and (B) and (ii) at least one liquid which does not dissolve at least one homopolymer of monomers (A) and (B) and (II) (iii) at least one liquid which dissolves at least one homopolymer of monomers (A) and (B) but does not dissolve at least another homopolymer of monomers (A) and (B).

4 Claims, No Drawings

PRODUCTION OF POROUS POLYMERS

This is a division of application Ser. No. 677,120, filed Apr. 14, 1976. now, now U.S. Pat. No. 4,093,570.

BACKGROUND OF THE INVENTION

1. Field of the Invention

The present invention relates to the production of porous polymers. More particularly, it relates to a method of producing porous polymers having polar groups, an average pore diameter of about 40 Å or more, a high pore volume and high mechanical strength.

2. Description of the Prior Art

Porous resins have a wide range of use as ion exchange resins of high fficiency, adsorbents, stationary phases for chromatography, carriers for catalysts and immobilized enzymes, etc., due to their high surface area, fine pore structure and high rate of mass transfer in the resins. Especially with regard to ion exchange resins having high porosity, there are various advantages such as a high rate of ion exchange with an increase in the ion diffusion velocity in resins, small swellability and shrinkability in contact with a liquid, high regeneration efficiency and high resistance to organic materials.

Many prior art references teaching various preparation methods for porous resins. For example, British Patents Nos. 932,125 and 932,126 describe a process for preparing a porous cross-linked copolymer by effecting suspension polymerization of a monomer mixture in the presence of a precipitant which is a liquid substantially insoluble in water (a) which dissolves the monomer mixture and (b) which does not swell the product copolymer in an amount sufficient to separate the product copolymer from the monomer phase. In this method, phase separation takes place when about 40 to 50 percent by weight, based on the total weight of the monomers, of a precipitant is employed, and the pore volume becomes less than about 50 percent based on the resin as such since the pore volume basically depends upon the relative amount of the precipitant. Furthermore, when the preparation of porous copolymers having a high pore volume is attempted, phase separation takes place so much that the mechanical strength of the product copolymers diminishes.

Japanese Patent Laid Open No. 71790/1973 describes a method of preparing a macroreticular cross-linked copolymer by copolymerizing a vinyl nitrogen heterocyclic monomer such as a vinylpyridine monomer with a polyvinyl aromatic hydrocarbon such as divinylbenzene in the presence of a phase extender (or an precipitant) in an amount sufficient to cause phase separation of the cross-linked copolymer. In this method, the phase extender may be employed in an amount of about 30 to 150 percent by weight based on the total weight of the monomers employed.

U.S. Pat. No. Re. 27,026 teaches a method of preparing a porous polymer having a predetermined porosity by polymerizing a monomer mixture of (a) at least one monomer selected from styrene type monomers, acrylates or methacrylates and vinyl carboxylates and (b) a cross-linking agent such as divinylbenzene, diethylene glycol dimethacrylate, etc., in the presence of a solvent mixture comprising: (a) at least one solvent and (b) at least one non-solvent, said solvent mixture having a solubility parameter chosen within the range $\delta = \delta_0 \pm 0.8$, where $\delta$ is the solubility parameter of the polymer and $\delta_0$ is the solubility parameter of the polymer, to control the average pore size of the polymer.

British Pat. No. 1,274,361 describes a process for the production of porous resins by polymerizing at least one monovinyl compound with at least one polyvinyl compound in the presence of: (a) at least one non-swelling adjuvant which dissolves the monomers but neither dissolves nor swells the polymers and (b) at least one swelling adjuvant which dissolves the monomers but only swells the polymer without dissolving them.

German Patent Laid Open No. 2121448 describes a suspension copolymerization in water of an ethylenically unsaturated monomer with a copolymerizable cross linking monomer in the presence of a mixed organic liquid composed of: (a) a component which solvates the copolymer such as an aromatic hydrocarbon and (b) a precipitating component for the copolymer such as an aliphatic hydrocarbon.

According to the latter three methods, porous resins having a microporous structure and a high pore volume can be produced by carrying out the polymerization in a large amount of appropriately chosen organic liquids. These methods, however, can be employed only when the polarities of the monomers employed are similar each other. For example, according to U.S. Pat. No. Re. 27,026 the solubility parameter for the polymers to be prepared is in the range of from about 8.8 to about 9.7 $(cal/ml)^{\frac{1}{2}}$. However, when a part of the monomers employed is a polar monomer, the polarity of the copolymer product varies to a great extent, even if the amount of the polar monomer is comparatively small, and the determination of a suitable solvent system is often difficult.

SUMMARY OF THE INVENTION

Therefore, the present invention provides a method of producing a porous polymer having polar groups, an average pore diameter of about 40 Å or more, a high pore volume and high mechanical strength which overcomes the above drawbacks, i.e., a method of producing a polar, porous polymer comprising polymerizing a monomer mixture comprising:

(A) about 2 to about 98 percent by weight of at least one cross-linkable monomer having a plurality of $CH_2\!=\!C\!<$ groups and (b) about 98 to about 2 percent by weight of at least one monomer selected from the group consisting of (i) copolymerizable monoethylenically unsaturated monomers and (ii) conjugated diene monomers, about 15 to about 100 percent by weight of the total monomers (A) and (B) being polar monomers, in the presence of an organic medium which does not react with any of monomers (A) and (B), and selected from the group consisting of:

(I) a mixed organic liquid consisting essentially of (i) at least one liquid which dissolves at least one homopolymer of monomers (A) and (B) and (ii) at least one liquid which does not dissolve at least one homopolymer of monomers (A) and (B) and (II) (iii) at least one liquid which dissolves at least one homopolymer of monomers (A) and (B) but does not dissolve at least another homopolymer of monomers (A) and (B).

DETAILED DESCRIPTION OF THE INVENTION

In the present invention, the term "polar monomer" denotes a monomer having a polar group selected from the group consisting of a nitrogen-containing heterocyclic group, amino group, alkylamino group, amido group, nitro group, carbonyl group, aldehyde group, carbonate group, hydroxy group, carboxyl group, sulfone group and phosphate group. The term "non-polar monomer" denotes a vinyl hydrocarbon or a monomer having a non-polar group selected from the group consisting of a carboxylic ester group, sulfide group, ether group and halogen group, but when the vinyl hydrocarbon or monomer has the above mentioned polar group, the vinyl hydrocarbon or monomer is denoted a "polar monomer." Furthermore, when a monomer has a group other than the above mentioned polar or non-polar groups, the monomer having a dielectric constant of 7 or more at 20° C. is denoted a "polar monomer" and the monomer having a dielectric constant of less than 7 at 20° C. is denoted a "non-polar monomer."

The cross-linkable monomers (A) which may be used in this invention have a plurality of $CH_2=C<$ groups, and preferably one to four $CH_2=C<$ groups.

Examples of suitable cross-linkable monomers (A) having a plurality of $CH_2=C<$ groups which are polar monomers include divinyldiphenylamine, divinylsulfone, divinylketone, divinylpyridines, divinylquinolines, bis (vinylpyridinoethyl) ethylenediamine, diallyl carbonate, diallyl amine, triallyl amine, triallyl phosphate, N,N'-methylenedimethacrylamide, N,N'-ethylenediacrylamide, N,N'-methylenediacrylamide, 1,3,5-triacroylhexahydro-1,3,5-triazine, diallylmelamine and the like.

Examples of suitable cross-linkable monomers (A) having a plurality of $CH_2=C<$ groups which are non-polar monomers include divinylbenzenes, divinyltoluenes, divinylxylenes, divinylnaphthalenes, divinylethylbenzenes, divinylphenanthrenes, trivinylbenzenes, divinylbiphenyles, divinyldiphenylmethanes, divinylbenzyls, divinylphenylethers, divinyldiphenylsulfides, divinylfurans, diallyl phthalate, diallyl maleate, diallyl fumarate, diallyl succinate, diallyl oxalate, diallyl adipate, diallyl sebacate, diallyl tartrate, triallyl tricarballylate, triallyl aconitate, triallyl citrate, ethylene glycol dimethacrylate triethylene glycol dimethacrylate, polyethylene glycol dimethacrylate, trimethylolpropane trimethacrylate, pentaerythritol tetramethacrylate, 1,3-butylene glycol diacrylate, 1,6-hexanediol diacrylate, trimethylpropane triacrylate, pentaerythritol tetracrylate, triallylisocyanurate and the like.

Such cross-linkable monomers (A) can be employed in an amount of from about 2 to about 98 percent by weight, preferably iron about 3 to about 80 percent by weight, and more preferably from about 4 to about 60 percent by weight based on the total weight of monomers (A) and (B). When the amount is less than about 2 percent by weight, the resulting porous polymers swell too remarkably for use.

Examples of suitable copolymerizable monoethylenically unsaturated monomers (B) which are polar monomers include dimethylaminoethyl methacrylate, hydroxyethyl methacrylate, hydroxymethylstyrene, N,N-dimethylaminostyrene, nitrostyrene, chloromethylaminostyrene; acrylonitrile and acrylonitrile derivatives such as methacrylonitrile, alpha-acetoxyacrylonitrile, alpha-chloroacrylonitrile, etc.; acrylic acid and methacrylic acid; vinyl ketones such as methyl vinyl ketone, ethyl isopropyl ketone, etc.; acrolein; acrylamide and acrylamide derivatives such as N-butoxymethylacrylamide, N-phenylacrylamide, diacetoneacrylamide, N,N-dimethylaminoethylacrylamide, etc.; and vinyl nitrogen heterocyclic compounds such as 2-vinylpyrrole, N-vinylpyrrole, N-vinylpyrrolidone, N-vinylsuccineimide, N-vinylphthalimide, N-vinylcarbazole, N-vinylindole, 2-vinylimidazole, 4-vinylimidazole, 5-vinylimidazole, 1-vinyl-2-methylimidazole, 1-vinyl-2-hydroxymethylimidazole, 1-vinyl-2-hydroxy-ethyl imidazole, 5-vinylpyrazole, 3-methyl-5-vinylpyrazole, 3-vinylpyrazoline, vinylbenzoxazole, 3-phenyl-5-vinyl-2-isooxazoline, N-vinyloxazolidone, 2-vinylthiazole, 2-vinyl-4-methylthiazole, 2-vinyl-4-phenylthiazole, 2-vinyl-4-methylthiazole, 2-vinyl-4-phenylthiazole, 2-vinyl-4,5-dimethylthiazole, 2-vinylbenzthiazole, 1-vinyltetrazole, 2-vinyltetrazole, 2-vinylpyridine, 4-vinylpyridine, 2-methyl-5-vinylpyridine, 2-N,N-dimethylamino-4-vinylpyridine, 2-vinyl-4,6-dimethyltriazine, 2-vinyl-4,6-diphenyltriazine, isopropenyltriazine, vinylquinoline, etc.

Examples of suitable copolymerizable monoethylenically unsaturated monomers (B) which are non-polar monomers include vinyl hydrocarbons such as styrene, vinyltoluenes, ethylvinylbenzenes, vinylnaphthalenes, vinylphenanthrenes, vinylmesitylenes, 1-vinyl-2-ethylacetylene, etc.; styrene derivatives such as chlorostyrenes, bromostyrenes, fluorostyrenes, dichlorostyrenes, trifluoromethylstyrenes, etc.; acrylates such as methyl acrylate, lauryl acrylate, chloromethyl acrylate, ethylacetoxy acrylate, etc.; methacrylates such as cyclohexyl methacrylate, dimethylaminoethyl methacrylate, glycidyl methacrylate, tetrahydrofurfuryl methacrylate, hydroxyethyl methacrylate, etc.; vinylidene compounds such as vinylidene chloride, vinylidene bromide, etc.; vinyl carboxylate such as vinyl acetate, vinyl butyrate, vinyl caprate, etc.; and vinylchloride.

Example of suitable copolymerizable conjugated diene monomers (B) include 1,3-butadiene, isoprene, chloroprene, piperylene, etc.

Such monomers (B) can be employed in an amount of from about 2 to about 98 percent by weight based on the total weight of monomers (A) and (B).

According to this invention it is required that the monomer mixture contains about 15 to about 100 percent by weight, and preferably about 20 to about 90 percent by weight, based on the total weight of monomers (A) and (B), of polar monomer. When the amount is less than about 15 percent by weight, the polarity of the porous polymer product decreases too much for practical purposes, and, furthermore, the selection of a suitable organic medium becomes difficult. Also, in the production of anion exchange resins using vinyl nitrogen heterocyclic compounds when the amount is less than about 15 percent by weight, the exchange capacity as an anion exchange resin becomes too small.

The gist of the present invention is the selection of an appropriate organic medium.

The guiding principle of selecting an organic medium in the production of polar, porous polymers according to this invention will now be illustrated.

Since in the polymerization system there is present an organic medium consisting essentially of: (i) at least one organic liquid which dissolves at least one homopolymer of the monomers which are the constituents of a polymer and (ii) at least one organic liquid which does not dissolve at least one homopolymer of the monomers which are the constituents of a polymer or (iii) at least one organic liquid which dissolves at least one homopolymers of the monomers chosen but does not dissolve at least another homopolymer of the monomers chosen, the organic medium exhibits a middle character between the so-called "precipitant" and "solvent" for the polymer produced. Therefore, phase separation slowly takes place in the course of the polymerization. Thus when an organic medium having a higher solubility for the polymer is employed, the phase separation mildly takes place and the pore diameter of the resulting polymer becomes smaller. On the other hand, when an organic medium having a higher precipitancy for the resulting polymer, the phase separation drastically takes place and the pore diameter becomes greater.

In the production of polar, porous polymers in accordance with this invention, firstly, the solubilities of various organic media for each homopolymer of the monomers chosen are checked up, and then the organic media are classified as follows;

Group (i): organic liquids which dissolve all the homopolymers of the monomers chosen.

Group (ii): organic liquids which do not dissolve any of the homopolymers of the monomers chosen.

Group (iii): organic liquids which dissolve at least one homopolymer of the monomers chosen but do not dissolve at least another homopolymer of the monomers chosen.

In carrying out the present invention, the following five combinations can typically be employed.

(1) A mixed organic liquid consisting of at least one liquid selected from Group (i) and at least one liquid selected from Group (iii).

(2) A mixed organic liquid consisting of at least one liquid selected from Group (ii) and at least one liquid selected from Group (iii).

(3) A mixed organic liquid consisting of at least two liquids selected from Group (iii).

(4) One liquid selected from Group (iii).

(5) A mixed organic liquid consisting essentially of at least one liquid selected from Group (i) and at least one liquid selected from Group (ii).

Especially when it is necessary to minutely control the pore structure of a polymer, for example, the following method is preferred. Firstly, the polymerization is carried out using an organic medium containing at least one appropriate liquid selected from Group (iii). When the pore diameter of a polymer obtained is smaller than the desired one, the pore diameter can be increased by adding at least one liquid selected from Group (ii) to the organic medium. Also when the pore diameter is greater than the desired one, the pore diameter can be decreased by adding at least one liquid selected from Group (i) to the organic medium. Especially when an organic medium containing at least two liquids selected from Group (iii) is employed, the pore diameter can minutely be controlled. Furthermore, when an organic medium containing at least one liquid selected from Group (i) and at least one liquid selected from Group (ii) is employed, the pore diameter can greatly be varied only by slightly varying the mixing ratio of the liquid from Group (i) to the liquid from Group (ii).

In designing the structure of porous polymers in accordance with this invention, the amount of an organic medium in addition to the organic medium chosen and the mixing ratio of organic liquids becomes an important factor. That is, the void volume, which means the volume of the part excluding the polymer chain in a polymer in the present invention, basically increases in proportion to the amount of an organic medium. Also, the pore volume of a polymer, which means the pore volume of a polymer having a pore diameter of 40 Å or more in the present invention depends on the relative amount of an organic medium employed and the pore diameter of a polymer produced. That is, with an increase in the pore diameter the pore volume becomes greater, and with an increase in the amount of an organic medium the pore diameter and pore volume become greater because phase separation easily takes place.

It is, accordingly, possible to control the pore diameter, void volume, pore volume and surface area of the porous polymers by changing factors such as the properties of the organic medium, the amount of the organic medium employed and the monomers chosen. Furthermore, when a mixed organic liquid is employed, the pore diameter, void volume, pore volume and surface area of the porous polymers can be arbitrarily and continuously varied by the mixing ratio of the organic liquids.

In the present invention the following method of selecting an organic liquid is employed.

To one organic liquid is added 5 weight percent of one monomer and 0.1 weight percent of azobisisobutyronitrile and the resulting solution is polymerized in a sealed glass tube for about 8 hours at the same temperature as is to be used for the polymerization reaction of this invention, and then the reaction mixture is observed. When the resulting polymer is precipitated, the organic liquid is denoted an "organic liquid which does not dissolve a homopolymer of the monomer," and when the resulting polymer is dissolved in the organic liquid, the organic liquid is denoted an "organic liquid which dissolves a homopolymer of the monomer." Also, with regard to one monomer having a plurality of $CH_2=C<$ groups employed as the monomer, when the reaction mixture of the resulting polymer and the organic liquid is opaque, the organic liquid is denoted an "organic liquid which does not dissolve a homopolymer of the monomer, and when the reaction mixture is transparent, the organic liquid is denoted an" organic liquid which dissolves a homopolymer of the monomer.

For example, the solubilities of some kinds of polymers in organic liquids are described in J. Brandrup and E. H. Immergut, *Polymer Handbook*, Chap. IV, pages 185–234 (1966) and Chap. IV, pages 241–265, Second Edition (1975) which is useful for the selection of solvents and non-solvents.

It is known that the solubility of polymers in organic liquids is evaluated by the relative value of the respective solubility parameters. This method, however, can only be applied to polymers having a comparatively low polarity, and when such a method is applied to the present invention which employes a monomer mixture containing at least 15 weight percent of a polar monomer, the selection of organic liquids by solubility parameters often leads to errors.

The organic liquids which may be employed in the present invention typically include lower aliphatic alcohols having at most 8 carbon atoms such as butanols, pentanols, hexanols, cyclohexanol, octanols, etc.; aliphatic or aromatic acid esters such as ethyl acetate, butyl acetates, methyl propionate, ethyl propionate, isobutyl propionates, butyl adipates, benzyl acetate, methyl benzoate, ethyl benzoate, dimethyl phthalate, diethyl phthalate, di-n-butyl phthalate, dioctyl phthalate, etc.; aliphatic ketones such as acetone, methyl ethyl ketone, diisopropyl ketone, methyl isobutyl ketone, diisobutyl ketone, cyclohexanone, acetophenone, etc.; aliphatic or aromatic nitriles such as propionitrile, n- butyronitrile, benzonitrile etc.; nitroalkanes such as nitroethane, nitropropane, etc.; cyclic ethers such as dioxane, dimethyl tetrahydrofuran, etc.; aromatic hydrocarbons such as benzene, ethylbenzene, diethylbenzenes, toluene, xylenes, tetraline, etc.; aliphatic hydrocarbons such as hexanes, cyclohexane, heptanes, octanes, decanes, etc.; chlorinated aliphatic or aromatic hydrocarbons such as methylene chloride, tetrachloroethane, chlorobenzene, o-dichlorobenzene, etc. Those skilled in the art, however, will recognize that the organic liquid mentioned are only illustrative and that a wide variety of other organic liquids may be equally effective.

Exemplary combinations of monomer mixtures and organic media are shown below, when Group (i) denotes organic liquids which dissolve all of the homopolymers of the monomers chosen; Group (ii) denotes organic liquids which do not dissolve any of the homopolymers of the monomers chosen; and Group (iii) denotes organic liquids which dissolve at least one homopolymer of the monomers chosen but do not dissolve at least another homopolymers chosen.

(I) When a monomer mixture consists essentially of: (a) at least one monomer selected from the group consisting of ethylene glycol dimethacrylate, divinylbenzenes and divinylpyridines, (b) at least one monomer selected from the group consisting of 2-vinylimidazole, N-vinyl-2-methylimidazole and 4-vinylpyridine, and (c) at least one monomer selected from the group consisting of styrene, ethylvinylbenzenes, 2-vinylpyridine, 2-methyl-5-vinylpyridine, methyl methacrylate, methyl acrylate and 1,3-butadiene, Group (i) includes acetophenone, cyclohexanone, tetrachloroethane, benzyl alcohol, benzonitrile, nitroethane and nitropropane; Group (ii) includes hexanes, cyclohexane, octanes and decanes; and Group (iii) includes benzene, toluene, xylenes, ethylbenzene, diethylbenzene and tetraline, butanols, pentanols, hexanols, cyclohexanol, octanols, ethyl acetate, butyl acetates, ethyl propionate, butyl propionates and butyl adipates, methyl benzoate, ethyl benzoate, dimethyl phthalate, diethyl phthalate, methyl ethyl ketone, methyl isobutyl ketone, diisobutyl ketone, chlorobenzene and o-dichloro-benzene.

(II) When a monomer mixture consists essentially of: (a) at least one monomer selected from the group consisting of ethylene glycol dimethacrylate, divinylbenzenes, trivinylbenzenes and divinylpyridines, (b) at least one monomer selected from the group consisting of 2-vinylpyridine and 2-methyl-5-vinylpyridine and (c) at least one monomer selected from the group consisting of styrene, ethylvinylbenzenes, methyl methacrylate, methyl acrylate and 1,3-butadiene; Group (i) includes benzene, toluene, xylenes, cyclohexanone, methyl ethyl ketone, anisole, methyl benzoate, ethyl benzoate, ethyl propionate, dimethyl phthalate, benzonitrile, nitropropane, chlorobenzene and o-dichlorobenzene; Group (ii) includes hexanes, cyclohexane, heptanes and octanes; and Group (iii) includes butanols, pentanols, hexanols, cyclohexanol and octanols.

(III) When a monomer mixture consists essentially of: (a) at least one monomer selected from the group consisting of ethylene glycol dimethacrylate, divinylbenzenes, and divinylpyridines, (b) at least one monomer selected from the group consisting of styrene, ethylvinylbenzenes, methyl methacrylate, 2-vinylpyridine, 2-methyl-5-vinylpyridine and 1,3-butadiene, and (c) at least one monomer selected from the group consisting of acrylonitrile and methacrylonitrile, Group (ii) includes hexanes, cyclohexane, heptanes, octanes, decanes, pentanols, hexanols, cyclohexanols, octanols; and Group (iii) includes benzene, toluene, xylenes, ethylbenzene, ethyl acetate, methyl propionate, butyl propionates, butyl adipates, methyl benzoate, ethyl benzoate and diethyl phthalate. Furthermore, when only acrylonitrile is selected from the above described group (c), Group (iii) additionally includes propionitrile, n-butyronitrile, nitroethane, nitropropane, methyl ethyl ketone, methyl isobutyl ketone and cyclohexanone.

(IV) When a monomer mixture consists essentially of: (a) at least one monomer selected from the group consisting of ethylene glycol dimethacrylate, divinylbenzenes and divinylpyridines, (b) at least one monomer selected from the group consisting of styrene, ethylvinylbenzenes and 2-methyl-5-vinylpyridine and (c) N-vinylcarbazole, Group (i) includes toluene, xylenes, ethylbenzene, tetraline, dioxane, tetrahydrofuran, chloroform, tetrachloroethane and o-dichlorobenzene; Group (ii) includes hexanes, octanes, hexanols, octanols and cyclohexanol; and Group (iii) includes acetone, methyl ethyl ketone, methyl isobutyl ketone, dimethyl tetrahydrofuran, ethyl acetate and methyl propionate.

(V) When a monomer mixture consists essentially of: (a) at least one monomer selected from the group consisting of ethylene glycol dimethacrylate, divinylbenzenes and divinylpyridines, (b) at least one monomer selected from the group consisting of styrene, ethylvinylbenzenes, methyl methacrylate and 2-vinylpyridine and (c) N-vinylpyrrolidone, Group (ii) includes hexanes, cyclohexane, heptanes and decanes; and Group (iii) includes ethyl acetate, butyl propionates, benzyl acetate, diisopropyl ketone, benzene, toluene, ethylbenzene and tetraline.

(VI) When a monomer mixture consists essentially of: (a) at least one monomer selected from the group consisting of divinylbenzens and N,N'-ethylene acrylamide, (b) at least one monomer selected from the group consisting of styrene, ethylvinylbenzenes, methyl methacrylate and methyl acrylate and (c) acrylamide, Group (ii) includes butanols, pentanols, hexanols, octanols, cyclohexanol, hexanes, heptanes, octanes, decanes and cyclohexane; and Group (iii) includes benzene, toluene, ethylbenzene, xylenes, tetraline, butyl acetates, ethyl propionate and methyl benzoate.

The organic medium which may be used in the present invention does not react any of monomers (A) and (B), and is used in an amount D in percent by weight based on the total weight of monomers (A) and (B) and represented by the equation, typically $$\text{about } 7\sqrt{X} \leq D \leq \text{about } 500\sqrt{X},$$

preferably $$\text{about } 20\sqrt{X} \leq D \leq \text{about } 200\sqrt{X},$$

and more preferably $$\text{about } 34\sqrt{X} \leq D \leq \text{about } 150\sqrt{X}$$

wherein X represents the percent by weight of monomer (A) based on the total weight of monomers (A) and (B).

Thus, when the degree of cross-linking increases, the network structure of the porous polymers becomes denser and it is, accordingly, preferred that the amount thereof be increased.

The polymerization according to this invention is preferably carried out in the presence of radical initiators. Such radical initiators include, for example, peroxides such as benzoyl peroxide, lauroyl peroxide, di-tert-butyl peroxide, dicumyl peroxide, methyl ethyl ketone peroxide, cumene hydroperoxide, tert-butyl hydroperoxide; and azo compounds such as azobisisobutyronitrile, 2,2′-azobis (2,4-dimethyl valeronitrile), 2-phenylazo-2,4-dimethyl-4- methoxy valeronitrile and 2-cyano-2-propylazoformamide. The amount of the radical initiators employed may vary depending upon factors such as the polymerization temperature selected, the organic liquid chosen, the amount of organic liquid employed and other factors. Generally, however, the amount is in the range of from about 0.01 to about 12 percent by weight based on the total weight of monomers (A) and (B). The preferred range is from about 0.1 to about 5 percent by weight, and a more preferred range is from about 0.2 to about 3 percent by weight. Two or more of these initiators having different decomposition temperatures may also be employed.

Radical polymerization methods by irradiation of light or other radiation may also be employed in this invention.

The polymerization temperature is typically in the range of about 0° C. to about 200° C., a preferred range is from about 15° C. to about 160° C., and a more preferred range is from about 30° C. to about 130° C.

The time of the polymerization may be varied within wide limits depending upon factors such as the radical initiator selected, the amount of radical initiator employed, the organic medium chosen, the monomers selected, the ratio of monomers to organic medium and other factors. Generally, the polymerization time is in the range of from about 30 minutes to about 50 hours. A preferred time is in the range of from about 1 to about 30 hours, and a more preferred time is in the range of from about 2 to about 20 hours. A conventional method of raising the polymerization temperature in the course of polymerization is preferred in the present invention as the method of shortening the polymerization time.

The polymerization reaction can be carried out either at atmospheric pressure, under a pressure above atmospheric or under a reduced pressure.

The porous polymers according to this invention may be prepared by polymerizing the monomer mixture in the presence of the organic liquid by a conventional solution polymerization method or suspension polymerization method, for examples, described in "Preparative Methods of Polymer Chemistry" by W. R. Sorenson and T. W. Campbell, published by John & Wiley and Sons, Inc., New York (1961).

In carrying out a suspension polymerization in water an important factor is the solubility of the organic medium in water. That is, when the solubility of the organic medium employed in water, is high, it sometimes happens that the concentration of the organic medium in the oil phase differs from the initial concentration. At such an occasion the solubility of the organic medium in water can be decreased by adding to the water a salt such as sodium chloride, calcium chloride, etc., in an amount of, typically, from about 0.1 to about 20 percent, preferably from about 0.5 to about 15 percent, and most preferably from about 1 to about 10 percent, by weight based on the weight of the water.

It is preferred to employ a suspending agent in carrying out the suspension polymerization.

Exemplary suspending agents which may be employed in the suspension polymerization in water include, for example, viscous substances such as gum arabic, alginic acid, tragacanth, agar-agar, methyl cellulose, hydroxyethyl cellulose, carboxymethyl cellulose, starch, gelatin, glue; synthetic high molecular weight polymers such as sodium polyacrylate, polyvinyl alcohol, polyvinylpyrrolidone; inorganic substances such as kaolin, bentonite, a hydrated complex of magnesium silicate, titanium dioxide, zinc oxide, calcium carbonate, talcum, barium sulfate, hydroxyapatite, aluminum hydroxide, calcium oxalate.

If necessary or desired, it is effective to additionally employ pH adjusting agents such as sodium phosphate, sodium dihydrogen phosphate, ammonium sulfate, sodium acetate, sodium hydrogen carbonate and anion surfactants including soaps of fatty acids, sodium dodecyl benzene sulfonate, sodium dodecyl sulfate, sodium lauryl sulfate, etc., in the suspension polymerization in water. The suspending agent, the pH adjusting agent and the anion surfactant can each be employed, respectively, in an amount of from about 0.001 to about 10 percent, preferably from about 0.01 to about 5 percent, more preferably from about 0.02 to about 3 percent, by weight based on the weight of the water employed.

The weight ratio of water to the mixture of monomers and organic medium which may be employed in the suspension polymerization in water is in the range of from about 0.5 to about 15, perferably from about 1 to about 10, and more preferably from about 2 to about 8.

The polymers which are obtained under the above described polymerization conditions still contains unreacted monomer and organic medium. Such unreacted monomer and organic medium can effectively be removed by: (1) a method comprising immersing the polymers in a water soluble medium which dissolves the monomer and organic medium for at least 2 to 5 hours, subsequently filtering the polymers and washing the polymers with water: or (2) a method comprising placing the polymers in a column and passing a water soluble medium which dissolves the monomer and organic medium and subsequently water through the column.

Exemplary washing media include methanol, ethanol, acetone, dioxane. acetonitrile, dimethyl formamide and the like which are soluble in water. Such washing media remaining in the polymers can readily and easily be eliminated by washing with water.

Generally, the efficiency of ion exchange resins is determined by equilibrium factor and kinetic factor. The former, that is, selectivity, is basically determined by the chemical structure of the resins, and the latter, that is, the ion exchange rate, greatly depends upon the physical structure of the resin. This ion exchange rate governs the efficiency of ion exchange resins.

It has now been found that the ion exchange resins obtained in the present invention possess a remarkably high ion exchange rate.

In the present invention, the apparent ion exchange rate of anion exchange resins is measured by the following method.

Anion exchange resins are packed in a column. Firstly, a sufficient amount of a 1 N hydrochloric acid solution is passed through the column and secondly a sufficient amount of ethanol is passed through the column to remove hydrochloric acid from voids in the resins and from between the resins. Then, the resins thus treated are introduced to a large amount of a 1 N aqueous sulfuric acid solution, and, while stirring, the concentration of chloride ion in the solution is measured with the passage of time by a chloride ion electrode. Sulfate ion is nearly quantitatively exchanged since sulfate ion is present in great excess. The time required for exchanging one half of the total chloride ions absorbed in the resins for sulfate ions "t½" is used as the indicator of the ion exchange rate.

It is well known that the ion exchange rate is remarkably increased by making resins porous.

The porous anion exchange resins according to this invention have a greatly increased ion exchange rate due to their increased pore volume and decreased density of very minute particles.

It has already been pointed out that in the production of porous resins using organic liquid as a phase separator, the amount of organic liquid necessary for the phase separation becomes smaller when the amount of cross-linkable monomers becomes greater. With regard to styrene-divinylbenzene series polymers, this is described in *Journal of Chemical Society*, p 304 (1965). Further, it is described in Japanese Patent Laid Open 71790/1973 that in the production of porous resins by copolymerizing a vinyl nitrogen heterocyclic monomer with a polyvinyl aromatic hydrocarbon the amount of a precipitant should be decreased when the rate of cross-linking is increased.

It has now been found that there is often proportional relationship between the amount of cross-linkable polymerizable monomers and the relative amount of organic liquid necessary for effecting phase separation, and that the ion exchange rate decreases with increased degrees of cross-linking and increases with increased relative amounts of the phase separator.

These two facts become very important in the preparation of porous ion exchange resins according to this invention, as will be explained by referring to the following Examples 1 to 7.

Methyl benzoate acts as a solvent for polydivinylbenzene and polyethylvinylbenzene and as a precipitant for poly-4-vinylpyridine at the same time. In Example 5, the solubility of the copolymer in methyl benzoate is increased due to the smaller amount of 4-vinylpyridine as compared to Example 1, and, as a result, the porosity of the copolymer of Example 5 is lowered. In order to increase the degree of cross-linking while maintaining the same porosity as in Example 1, it is necessary to increase the amount of methyl benzoate as in Example 2.

On the other hand, when an organic medium which precipitates a polymer of a monomer having a plurality of $CH_2=C<$ groups and dissolves a polymer of a copolymerizable monoethylenically unsaturated monomer or conjugated diene monomer at the same time is employed as a phase separator, it is necessary to decrease the amount of organic medium with an increase in the rate of cross-linking.

With regard to the relationship between the ion exchange rate and the structure of the ion exchange resins, when only the degree of cross-linking is increased while maintaining the amount of organic medium constant, the ion exchange rate diminishes due to increased cross-linking density. This is clearly seen by comparing Example 1 with Example 5. In this instance, when the ratio of organic medium as a phase separator is increased as in Example 2, an increase ion exchange rate is observed once again. Also, as in Example 7 when a precipitant is employed, pore volume decreases and, accordingly, the ion exchange rate lowers.

Thus, the present invention provides a method of preparing ion exchange resins of high efficiency. According to this invention, anion exchange resins having a similar structure and rate of ion exchange with regard to different degrees of cross-linking can be prepared by appropriately selecting a monomer mixture and an organic medium, and varying the amount of the organic medium selected.

In this invention, the pore size distribution and pore volume are measured by the mercury penetration method described in "Fine Particle Measurement" by Clyde Orr, Jr. and J. M. Dallavalle, published by Macmillan Co., New York (1959). The apparatus employed is a Mercury Penetration Porosimeter, 900/910 Series, made by Micrometrics Instrument Corporation, and calculations are made from the following equation;

$$r = 176.8/p$$

wherein r represents pore diameter in Å; and p represents the pressure of the mercury in p.s.i. when mercury is gradually forced into 0.1 to 0.5 g of thoroughly dried porous polymer until the pressure reaches 50,000 p.s.i.

According to this method, it is possible to measure pore diameters as small as about 40 Å. In this invention, a pore diameter is defined to be about 40 Å or more.

The polar, porous polymers according to this invention have a pore diameter of from about 40 to about 10,000 Å, and preferably from about 60 to about 5,000 Å.

The porous polymers according to this invention has a wide range of use as anion exchange resins, stationary phases for gas chromatography and liquid chromatography, adsorbents for acidic gases such as hydrogen sulfide, sulfurous acid gas, nitrogen oxides, mercaptans, fatty acids, basic gases such as ammonia, amines and other offensive odors, adsorbents for heavy metal ions in water, surfactants, coloring materials, high molecular weight polymers, carriers for immobilized enzymes and for affinity chromatography, etc.

This invention will now be illustrated in more detail by several non-limiting examples.

EXAMPLES 1-7

Into a 3 liter four necked flask equipped with a four paddle stainless steel stirrer, thermometer, reflux condenser and nitrogen inlet were added freshly distilled 4-vinylpyridine, technical divinylbenzene containing 56% by weight of divinylbenzene and 44% by weight of ethylvinylbenzene in an amount as set forth in Table 1, an organic medium as set forth in Table 1, 0.5 g of benzoyl peroxide as the radical initiator and water containing 0.5% by weight of hydroxyethyl cellulose (molecular weight: $4 \times 10^4$) and 5% by weight of sodium chloride in an amount set forth in Table 1, and the contents of the flask were agitated at 250 rpm to form a uniform dispersion. Then the suspension was heated with agitation at 250 rpm firstly at 60° C. for 4 hours, secondly at 75° C. for 4 hours and thirdly at 90° C. for 4 hours. The resulting polymer was subjected to wet classification with a set of sieves and subsequently thoroughly washed with methanol to remove unreacted monomers and organic medium. The porous polymer thus obtained was in the form of spherical particles. The properties of the porous polymer are shown in Table 1.

EXAMPLE 8

Into the same flask as in Example 1 were charged 50 g of freshly distilled acrylonitrile, 33 g of styrene, 17 g of technical divinylbenzene containing 80% by weight of divinylbenzene and 20% by weight of ethylvinylbenzene, 150 g of toluene, 50 g of cyclohexanol and 2 g of benzoyl peroxide. To the flask were added 2000 g of water containing 9 g of sodium dodecylsulfate, 5 g of sodium dihydrogen sulfate, 20 g of sodium chloride and 10 g of hydroxyapatite (average particle diameter: 0.3 micron), and the contents of the flask were agitated at 300 rpm to form a uniform dispersion. Then the suspension was heated firstly at 50° C. for 4 hours, secondly at 60° C. for 4 hours and thirdly at 70° C. for 4 hours with agitation at 300 rpm. The reaction mixture was treated in the same manner as in Example 1 to give a porous polymer in the form of spherical particles having a particle diameter of 30 to 220 microns. The yield of the polymer was 96%. The structural properties of the porous polymer were as follows;

Bulk density: 0.31 g/cm$^3$
Average pore diameter: 4820 Å
Pore volume: 1.67 cm$^3$/g

EXAMPLE 9

Into the same flask as in Example 1 were charged 50 g of freshly distilled methacrylonitrile, 50 g of technical divinylbenzene containing 80% by weight of divinylbenzene and 20% by weight of ethylvinylbenzene, 1 g of 2,2'-azobis (2,4-dimethylvaleronitrile) and 400 g of n-butyl acetate, and the contents mixed. Then, to the flask were added 1200 g of water containing 12 g of methylcellulose and 2.4 g of sodium chloride, and the contents of the flask were agitated at 300 rpm to form a uniform dispersion. The suspension was then heated at 60° C. for 30 hours with agitation at 300 rpm. The yield of the polymer was 98%. The resulting polymer was subjected to wet classification with a set of sieves and thoroughly washed with methanol. The porous polymer thus obtained was in the form of spherical particles having a diameter of 40 to 320 microns. The polymer had an average pore diameter of 150 Å.

EXAMPLES 10–12

Into the same flask as in Example 1 were charged 60 g of 2-methyl-5-vinylpyridine, 35 g of styrene, 5 g of trivinylbenzene, 1 g of azobisisobutyronitrile and 200 g of a mixed organic medium of methyl isobutyl ketone and isooctane in a ratio as set forth in Table 2, and the system mixed. Then, to the flask were added 2000 g of water containing 80 g of sodium chloride and 2 g of polyvinyl alcohol (molecular weight: 5×10$^5$) and the contents of the flask agitated at 400 rpm to form a uniform dispersion. The suspension was then heated at 80° C. for 8 hours. The resulting polymer was subjected to wet classification with a set of sieves and thoroughly washed with methanol. The porous polymer thus obtained was in the form of spherical particles. The properties of the polymer are shown in Table 2.

EXAMPLE 13

20 g of acrylamide recrystallized from ethyl acetate, 5 g of N,N'-methylenediacrylamide and 0.5 g of 2-phenylazo-2,4-dimethyl-4-methoxyvaleronitrile were dissolved in 50 g of ethylbenzene, and the resulting solution charged into a 200 ml pressure-resistant glass ampoule. The ampoule was then sealed and heated in an oil bath at 140° C. for 40 minutes. After cooling, the contents of the ampoule were taken out, pulverized, washed with acetone in order to remove unreacted monomers and ethylbenzene and subjected to wet classification with a set of sieves to give a polymer having the desired particle size.

The dried porous polymer had an average diameter of 520 Å, a pore volume of 0.62 cm$^3$/g and a bulk density of 0.32.

EXAMPLE 14

40 g of N-vinylcarbazole, 20 g of methyl methacrylate, 20 g of divinylpyridine and 1.5 g of azobisisobutyronitrile were dissolved into 300 g of methylisobutyl ketone and the resulting solution charged into a 2 liter four necked flask equipped with a four paddle stainless steel stirrer, thermometer, reflux condenser and nitrogen inlet. To the flask were added 400 g of water containing 1 g of gelatin, 1 g of sodium chloride and 1 g of bentonite, and the contents of the flask vigorously agitated until a uniform dispersion was obtained. The suspension was then heated firstly at 50° C. for 2 hours, secondly at 70° C. for 4 hours and thirdly at 90° C. for 4 hours with agitation. The yield of the polymer was 94%. The polymer thus obtained was placed in a filtering vessel equipped with a glass filer and thoroughly washed with water and subsequently with acetone and further with water to remove unreacted monomers and organic medium. The porous polymer had an average pore size of 150 Å and a pore volume of 1.05 cm$^3$/g.

EXAMPLES 15–17

2 g of styrene, 8 g of N-vinylpyrrolidone, 10 g of ethyleneglycol dimethacrylate and 0.2 g of 2-cyano-2-propylazoformamide were dissolved in 60 g of a mixed organic liquid of ethyl acetate and diethyl phthalate in a ratio as set forth in Table 3, and the resulting solution was charged into a 100 ml pressure-resistant glass ampoule. The ampoule was then sealed and heated at 120° C. for 1.5 hours. The reaction mixture was treated in the same manner as in Example 13 to yield porous polymers. The physical properties of the polymers are shown in Table 3.

EXAMPLES 18–21

The procedures of Example 1 for preparing porous polymers were repeated except that the polymerization conditions as set forth in Table 4 were employed. The properties of the resulting porous polymers are shown in Table 4.

EXAMPLES 22–24

The procedures of Example 8 for preparing porous polymers were repeated except that 0.5 g of benzoyl peroxide was employed instead of 2 g of benzoyl peroxide and the conditions as set forth in Table 4 were employed. The properties of the resulting porous polymers are shown in Table 4.

EXAMPLE 25

The procedure of Example 14 for preparing a porous polymer was repeated except that the polymerization conditions as set forth in Table 5 were employed. The properties of the resulting porous polymer are shown in Table 5.

EXAMPLES 26-28

The monomer mixtures as set forth in Table 5 and 1 g of azobisisobutyronitrile were dissolved into the organic liquid set forth in Table 5, and to the resulting solution were added 1600 g of water containing 6.4 g of carboxymethyl cellulose (molecular weight: $1.2 \times 10^4$) and 3 g of sodium chloride and the mixture was vigorously agitated until a uniform dispersion was obtained. The suspension was then heated at 70° C. for 24 hours, whereafter the reaction mixture was treated in the same manner as in Example 1. The properties of the resulting porous polymer are shown in Table 5.

EXAMPLE 29

The procedure of Example 1 for preparing a porous polymer was repeated except that an autoclave equipped with a stirrer and therometer was employed instead of the flask, and the temperature was set at 70° C., the time of the polymerization was 15 hours and the polymerization conditions as set for in Table 5 were employed. The properties of the resulting porous polymer are shown in Table 5.

EXAMPLES 30-33

The procedures of Example 1 for preparing porous polymers were repeated except that the polymerization conditions as set forth in Table 6 were employed. The properties of the resulting porous polymers are shown in Table 6.

Table 2

| | | | Porous Polymer | | |
| | | | | Porosity | |
| Ex. No. | Organic Medium (g.) | | Bulk Density | Particle Diameter (micron) | Average Pore Diameter (A) | Pore Volume (cm³/g) |
|---|---|---|---|---|---|---|
| 10 | MIBK* | 180 | 0.14 | 50-180 | 130 | 1.08 |
| 11 | Isooctane MIBK | 20 170 | 0.16 | 40-200 | 560 | 1.29 |
| 12 | Isooctane MIBK | 30 160 | 0.15 | 60-220 | 1300 | 1.56 |
| | Isooctane | 40 | | | | |

*MIBK : Methyl isobutyl ketone

Table 3

| | | | Porous Polymer | | |
| | | | | Porosity | |
| Example No. | Organic Medium (g) | | Bulk Density | Average Pore Diameter (A) | Pore Volume (cm³/g) |
|---|---|---|---|---|---|
| 15 | Ethyl acetate | 40 | 0.18 | 520 | 0.21 |
| 16 | Diethyl phthalate Ethyl acetate | 20 30 | 0.17 | 930 | 0.23 |
| 17 | Diethyl phthalate Ethyl acetate | 30 20 | 0.17 | 2160 | 0.24 |
| | Diethyl phthalate | 40 | | | |

Table 1

| | | | | Polymerization | | | | |
| | | | | | Suspending Agent | | | |
| | Monomers | | | Organic | Hydorxyethyl | | | |
| Example No. | 4VP* (g) | EVB* (g) | DVB* (g) | Medium (g) | cellulose g (%) | NaCl g (%) | Water (g) | Yield (%) |
|---|---|---|---|---|---|---|---|---|
| 1 | 82.2 | 7.8 | 10 | MBz** 130 | 4 (0.5) | 40 (5) | 800 | 98 |
| 2 | 46.4 | 23.6 | 30 | MBz 230 | 6 (0.5) | 60 (5) | 1200 | 98 |
| 3 | 82.2 | 7.6 | 10 | MBz 50 | 2.5 (0.5) | 25 (5) | 500 | 97 |
| 4 | 46.4 | 23.6 | 30 | MBz 70 | 3 (0.5) | 30 (5) | 600 | 99 |
| 5 | " | " | " | MBz 130 | 4 (0.5) | 40 (5) | 800 | 98 |
| 6 | " | " | " | EBz** 130 | 4 (0.5) | 40 (5) | 800 | 99 |
| 7 | 82.2 | 7.8 | 10 | ISO** 30 | 2.5 (0.5) | 25 (5) | 500 | 98 |

| | | | Porous Polymer | | | |
| | | | Exchange | Cl⁻/SO₄⁻⁻ | Porosity | |
| Example No. | Bulk Density | Particle Diameter (micron) | Capacity (HCl Type) (meq/g) | Exchange Rate t½ (second) | Average Pore Diameter A | Pore Volume (cm³/g) |
|---|---|---|---|---|---|---|
| 1 | 0.29 | 40-200 | 5.92 | 1.54 | 580 | 0.88 |
| 2 | 0.20 | 40-280 | 3.70 | 1.48 | 620 | 1.52 |
| 3 | 0.38 | 30-250 | 5.76 | 10.8 | <40 | — |
| 4 | 0.34 | 40-220 | 3.75 | 10.2 | <40 | — |
| 5 | 0.28 | 30-190 | 3.69 | 4.42 | 135 | 0.98 |
| 6 | 0.27 | 30-300 | 3.72 | 4.02 | 710 | 1.12 |
| 7 | 0.44 | 30-290 | 5.98 | 13.4 | 505 | 0.23 |

*4VP : 4-Vinylpyridine, EVB : Ethylvinylbenzene
DVB : Divinylbenzene
**MBz : Methyl benzoate, EBz : Ethyl benzoate, ISO : Isooctane Table 4

| | Polymerization | | | | Porous Polymer | | | | |
| | | | | | Particle | Exchange Capacity (HCl | Cl⁻/SO₄⁻ Exchange Rate | Average Pore | Pore |
| Ex. No. | Monomer Mixture (g) | Organic Medium (g) | | Water (g) | Bulk Density | Diameter (micron) | -Type) (meq/g) | t½ (second) | Diameter (A) | Volume (cm³/g) |
|---|---|---|---|---|---|---|---|---|---|---|
| 18 | 4-Vinylpyridine 40 | Dimethyl phthalate | | | | | | | | |

Table 4-continued

| Ex. No. | Monomer Mixture (g) | | Organic Medium (g) | | Water (g) | Polymerization Bulk Density | Particle Diameter (micron) | Exchange Capacity (HCl -Type) (meq/g) | Cl⁻/SO₄⁻ Exchange Rate t₁ (second) | Average Pore Diameter (A) | Pore Volume (cm³/g) |
|---|---|---|---|---|---|---|---|---|---|---|---|
|  | 2-Vinylpyridine | 30 |  |  | 150 | 1200 | 0.26 | 60–220 | 5.21 | 1.98 | 320 | 0.88 |
|  | Ethylvinylbenzene | 5 | Acetophenone | 50 |  |  |  |  |  |  |  |  |
|  | Divinylbenzene | 25 |  |  |  |  |  |  |  |  |  |  |
| 19 | " |  | Diethyl phthalate |  | 150 | " | 0.24 | 40–190 | 5.18 | 1.87 | 980 | 1.26 |
|  |  |  | Acetophenone | 50 |  |  |  |  |  |  |  |  |
| 20 | " |  | Di-n-butyl phthalate |  | 150 | " | 0.21 | 50–250 | 5.29 | 1.69 | 1520 | 1.54 |
|  |  |  | Acetophenone | 50 |  |  |  |  |  |  |  |  |
| 21 | 2-Vinylpyridine | 60 | sec-Butanol | 150 | 2200 | 0.18 | 40–280 | 4.70 | 1.13 | 2500 | 1.88 |
|  | Ethylene glycol dimethacrylate | 40 | Cyclohexanol | 150 |  |  |  |  |  |  |  |  |
| 22 | 2-Methyl-5-Vinyl-pyridine | 40 | Benzene | 180 | 700 | 0.28 | 60–250 | 4.02 | 2.92 | 850 | 0.93 |
|  | Acrylonitrile | 40 |  |  |  |  |  |  |  |  |  |  |
|  | 2,5-Divinylpyridine | 20 |  |  |  |  |  |  |  |  |  |  |
| 23 | " |  | Toluene |  | 180 | " | 0.26 | 80–300 | 4.10 | 2.73 | 1290 | 1.22 |
| 24 | " |  | m-Xylene |  | 180 | " | 0.25 | 80–250 | 4.11 | 2.55 | 2830 | 1.44 |

Table 5

| Example No. | Monomer Mixture (g) | | Organic Medium (g) | | Water (g) | Bulk Density | Particle Diameter (micron) | Average Pore Diameter (A) | Pore Volume (cm³/g) |
|---|---|---|---|---|---|---|---|---|---|
| 25 | 2-Vinylpyridine | 50 | n-Octanol | 150 | 1600 | 0.18 | 30–200 | 150 | 0.72 |
|  | Pentserythritol tetramethacrylate | 50 | amisole | 150 |  |  |  |  |  |
| 26 | 1-Vinyl-2-methyl-imidazole | 60 | Cyclohexanol | 20 | 1600 | 1.19 | 50–250 | 170 | 0.92 |
|  |  |  | m-Xylene | 100 |  |  |  |  |  |
|  | Ethylene glycol dimethacrylate | 40 |  |  |  |  |  |  |  |
| 27 | " |  | Cyclohexanol | 150 | " | 0.17 | 40–320 | 560 | 1.84 |
|  |  |  | m-Xylene | 150 |  |  |  |  |  |
| 28 | " |  | Cyclohexanol | 100 | " | 0.15 | 40–300 | 1300 | 2.52 |
|  |  |  | m-Xylene | 200 |  |  |  |  |  |
| 29 | Acrylonitrile | 40 | Methylene chloride | 100 | 1400 | 0.2 | 20–220 | 1260 | 1.86 |
|  | 1,3-Butadiene | 35 |  |  |  |  |  |  |  |
|  | Divinylbenzene | 20 | Methyl ethyl ketone | 150 |  |  |  |  |  |
|  | Ethylvinylbenzene | 5 |  |  |  |  |  |  |  |

Table 6

| Example No. | Monomer Mixture (g) | | Organic Medium (g) | | Water (g) | Bulk Density | Particle Diameter (micron) | Average Pore Diameter (A) | Pore Volume (cm³/g) |
|---|---|---|---|---|---|---|---|---|---|
| 30 | 2-Vinylimidazole | 50 | Nitroethane | 200 | 2000 | 0.16 | 40–200 | 820 | 1.96 |
|  | Ethylene glycol dimethacrylate | 50 | Heptane | 100 |  |  |  |  |  |
| 31 | " |  | Chlorobenzene | 200 | 1800 | 0.20 | 50–320 | 4200 | 2.20 |
|  |  |  | Octane | 50 |  |  |  |  |  |
| 32 | 2-Methyl-5-vinyl-pyridine | 25 | 0-Dichlorobenzene | 100 | 1800 | 0.22 | 60–400 | 3200 | 1.88 |
|  | N-Vinylcarbazole | 50 | n-Octanol | 50 |  |  |  |  |  |
|  | Divinylbenzene | 20 |  |  |  |  |  |  |  |
|  | Ethylvinylbenzene | 5 |  |  |  |  |  |  |  |
| 33 | Methyl methacrylate | 40 | Cyclohexanol | 150 | 1500 | 0.30 | 50–250 | 75 | 0.21 |
|  | 2-Vinylpyridine | 50 |  |  |  |  |  |  |  |
|  | Divinylpyridine | 10 |  |  |  |  |  |  |  |

While the invention has been described in detail and with reference to specific embodiments thereof, it will be apparent to one skilled in the art that various changes and modifications can be made therein without departing from the spirit and scope thereof.

What is claimed is:

1. A method of producing a polar, porous polymer comprising polymerizing a monomer mixture comprising:
   (A) about 2 to about 98 percent by weight of at least one cross-linkable monomer having a plurality of CH$_2$=C< groups and
   (B) about 98 to about 2 percent by weight of at least one monomer selected from the group consisting of (i) copolymerizable monoethylenically unsaturated monomers and (ii) conjugated diene monomers, about 15 to about 100 percent by weight of the total monomers (A) and (B) being polar monomers, in the presence of a mixed organic liquid which does not react with any of monomers (A) and (B) and consisting essentially of: (i) at least one liquid which dissolves all of the homopolymers of monomers (A) and (B) and (ii) at least one liquid which does not dissolve any of the homopolymers of monomers (A) and (B), said mixed organic liquid being employed in an amount D in percent by weight based on the total weight of monomers (A) and (B) and represented by the equation $$\text{about } 34\sqrt{X} \leq D \leq \text{about } 150\sqrt{X}$$

wherein X represents the percent by weight of monomer (A) based on the total weight of monomers (A) and (B).

2. The method of claim 1, wherein said monomer mixture consists essentially of: (a) at least one monomer selected from the group consisting of ethylene glycol dimethacrylate, divinylbenzenes, trivinylbenzenes and divinylpyridines, (b) at least one monomer selected from the group consisting of 2-vinylimidazole, N-vinyl-2-methylimidazole and 4-vinylpyridine and (c) at least one monomer selected from the group consisting of styrene, ethylvinylbenzenes, 2-vinylpyridine, 2-methyl-5-vinylpyridine, methyl methacrylate, methyl acrylate, and 1,3-butadiene, acid organic medium consists essentially of: (a) at least one liquid selected from the group consisting of acetophenone, cyclohexanone, tetrachloroethane, benzyl alcohol, benzonitrile, nitroethane and nitropropane and (b) at least one liquid selected from the group consisting of hexanes, cyclohexane, heptanes, octanes and decanes.

3. The method of claim 1, wherein said monomer mixture consists essentially of: (a) at least one monomer selected from the group consisting of ethylene glycol dimethacrylate, divinylbenzenes, trivinylbenzenes and divinylpyridines, (b) at least one monomer selected from the group consisting of 2-vinylpyridine and 2-methyl-5-vinylpyridine, and (c) at least one monomer selected from the group consisting of styrene, ethylvinylbenzenes, methyl methacrylate, methyl acrylate and 1,3-butadiene and said organic medium consists essentially of: (a) at least one liquid selected from the group consisting of toluene, xylenes, methyl ethyl ketones, cyclohexanone, methyl benzoate, ethyl benzoate, dimethyl phthalate, benzonitrile and nitropropane and at least one liquid selected from the group consisting of hexanes, heptanes, octanes and cyclohexane.

4. The method of claim 1, wherein said monomer mixture consists of: (a) at least one monomer selected from the group consisting of ethylene glycol dimethacrylate, divinylbenzenes and divinylpyridines, (b) at least one monomer selected from the group consisting of styrene, ethylvinylbenzenes and 2-methyl-5-vinylpyridine and (c) N-vinylcarbazole and said organic medium consists essentially of: (a) at least one liquid selected from the group consisting of toluene, xylenes, ethylbenzene, tetraline, tetrahydrofuran, dioxane, chloroform, o-dichlorobenzene and tetrachloroethane and (b) at least one liquid selected from the group consisting of hexanes, octanes, hexanols, octanols and cyclohexanol.

* * * * *